(12) United States Patent
Taniguchi et al.

(10) Patent No.: US 8,189,142 B2
(45) Date of Patent: May 29, 2012

(54) ELECTRO-OPTICAL DEVICE, COLOR FILTER SUBSTRATE AND ELECTRONIC APPARATUS

(75) Inventors: Yoshio Taniguchi, Chino (JP); Hiroaki Mochizuki, Chino (JP); Hirotaka Kawata, Suwa (JP); Hidetoshi Ushiyama, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 210 days.

(21) Appl. No.: 12/495,941

(22) Filed: Jul. 1, 2009

(65) Prior Publication Data

US 2010/0053512 A1 Mar. 4, 2010

(30) Foreign Application Priority Data

Sep. 1, 2008 (JP) ................................. 2008-223506

(51) Int. Cl.
*G02F 1/1335* (2006.01)
(52) U.S. Cl. ........ 349/106; 349/122; 349/153; 349/158; 349/160; 359/891
(58) Field of Classification Search .................. 349/106, 349/138, 153, 158, 160, 122; 359/885, 891, 359/892; 345/88
See application file for complete search history.

(56) References Cited

U.S. PATENT DOCUMENTS

| | | | |
|---|---|---|---|
| 2002/0081503 A1 | 6/2002 | Kawase et al. | |
| 2003/0016321 A1* | 1/2003 | Takizawa | 349/113 |
| 2003/0076609 A1* | 4/2003 | Kawase | 359/885 |
| 2004/0183084 A1* | 9/2004 | Wachi | 257/98 |
| 2005/0012888 A1* | 1/2005 | Fujioka et al. | 349/153 |
| 2005/0046769 A1* | 3/2005 | Yi et al. | 349/106 |
| 2005/0253917 A1* | 11/2005 | Shang et al. | 347/107 |

FOREIGN PATENT DOCUMENTS

| | | |
|---|---|---|
| JP | 2002-250811 | 9/2002 |
| JP | 2005-099614 | 4/2005 |
| JP | 2007-279101 | 10/2007 |

* cited by examiner

*Primary Examiner* — Dung Nguyen
*Assistant Examiner* — Tai Duong
(74) *Attorney, Agent, or Firm* — AdvantEdge Law Group, LLC

(57) ABSTRACT

Provided is an electro-optical device including: a pair of substrates; an electro-optical material sandwiched between the pair of substrates; a seal material disposed in a seal region located at the periphery of a region in which the electro-optical material is provided on the pair of substrates so as to bond the pair of substrate to each other, between the pair of substrates; and a coloring layer provided in a concave portion formed in the region in which the electro-optical material is provided on one substrate, wherein a upper surface of a coloring layer facing the electro-optical material is formed nearer to the other substrate than a seal region surface overlapping with the seal material on one substrate.

8 Claims, 8 Drawing Sheets

ELECTRO-OPTICAL DEVICE, COLOR FILTER SUBSTRATE AND ELECTRONIC APPARATUS

BACKGROUND

1. Technical Field

The present invention relates to a technical field of electro-optical devices such as a liquid crystal device, a color filter substrate, and an electronic apparatus including the electro-optical device, such as a liquid crystal projector.

2. Related Art

In this kind of an electro-optical device, in a seal region located at the periphery of a pixel region in which a plurality of pixel portions is formed, a pair of substrates is bonded by a seal material, and, for example, liquid crystal is sandwiched between the pair of substrates as an electro-optical material. In order to control the thickness of the liquid crystal (cell gap) between the pair of substrates, a gap material (or a spacer material) is provided in at least the seal region, and the gap between the pair of substrates (inter-substrate gap) is controlled.

In order to perform a color display by the plurality of pixel portions arranged in the pixel region, a coloring layer is provided in the pixel region on at least one of the pair of substrates. In this case, in the pixel region, in which the coloring layer is provided, and the seal region, in which the coloring layer is not provided, a step difference occurs in a layer on which the coloring layer is provided and the inter-substrate gap is changed. In order to avoid such a situation, for example, in JP-A-2005-099614, technology of forming a concave portion in the pixel region of one substrate and providing a coloring layer in the concave portion so as to equalize an upper surface of one substrate facing liquid crystal is suggested. In addition, known documents relevant to the invention include JP-A-2007-279101 and JP-A-2002-250811.

According to the technology disclosed in JP-A-2005-099614, in one substrate, since the upper surface of the pixel region and the upper surface of the seal region are on the same plane, if the cell gap is narrowed in order to increase a response speed, the gap material for controlling the cell gap needs to be decreased. However, it is difficult to manufacture small gap material with high accuracy. Even when the small gap material can be manufactured with high accuracy, the manufacturing cost may be increased. According to the technology disclosed in JP-A-2005-099614, it is difficult to narrow the cell gap with a relatively low manufacturing cost.

SUMMARY

An advantage of some aspects of the invention is that it provides an electro-optical device capable of performing a color display, for example, an electro-optical device capable of realizing a narrow cell gap with relatively low manufacturing cost, a method of manufacturing the same, and an electronic apparatus including the electro-optical device.

According to an aspect of the invention, there is provided an electro-optical device including: a pair of substrates; an electro-optical material sandwiched between the pair of substrates; a seal material disposed in a seal region located at the periphery of a region in which the electro-optical material is provided on the pair of substrates so as to bond the pair of substrate to each other, between the pair of substrates; and a coloring layer provided in a concave portion formed in the region in which the electro-optical material is provided on one substrate, wherein a coloring layer upper surface of the coloring layer facing the electro-optical material is formed nearer the other substrate than a seal region surface overlapping with the seal material on one substrate.

According to the electro-optical device of the invention, the pair of substrates is bonded to each other by the seal material in the seal region and for example, liquid crystal is enclosed between the substrates as the electro-optical material. That is, the electro-optical material is enclosed in an internal space surrounded by the pair of substrates and the seal material. A planar region occupied by the electro-optical material is for example, a pixel region or a pixel array region (also called an "image display region"). In this region, and display electrodes or alignment films are formed on the surfaces of the pair of substrates which face each other. Typically, a gap material or a spacer material is dispersed or mixed in the seal material, and the gap between the pair of substrates is controlled by this gap material such that the cell gap (thickness of the liquid crystal) is adjusted. In a region in which the electro-optical material is provided on one of the pair of substrates, for example, in one pixel, for example, R (red), G (green) and B (blue) sub pixels are provided, and a "coloring layer" according to the invention is provided in each sub pixel as a color filter. In each sub pixel, for example transmitted light is emitted via the coloring layer such that the color display is performed in the pixel units.

In the invention, the coloring layer is provided in the concave portion formed in the region in which the electro-optical material is provided on one substrate (for example, the pixel region). Accordingly, it is possible to reduce a step difference between the region in which the coloring layer is formed on one substrate (for example, the pixel region) and the region in which the coloring layer is not formed (for example, a peripheral region including the seal region and located at the periphery of the pixel region), which is generated due to the thickness of the coloring layer. Accordingly, for example, when the alignment film is formed on the surface of one substrate facing the other substrate by a coating method, it is possible to reduce coating unevenness generated due to the step difference between the region in which the coloring layer is formed on one substrate and the region in which the coloring layer is not formed. Thus, it is possible to reduce a display failure generated due to coating unevenness on one substrate.

In addition, in the invention, in particular, the upper surface of the coloring layer facing the electro-optical material is nearer to the other substrate than the seal region surface overlapping with the seal material on one substrate. That is, for example, the coloring layer is formed in the concave portion formed in the pixel region on one substrate such that the coloring layer upper surface is nearer to the other substrate than the seal region surface. Accordingly for example even when a gap material with the diameter of about 2.0 μm, such as bead-shaped glass or glass fiber, is dispersed or mixed in the seal material as the gap material, the thickness (that is, the cell gap) of the electro-optical material can be for example smaller than, about 2.0 μm. In other words, by using the gap material having, for example, the diameter of about 2.0 μm and relatively low cost, such as bead-shaped glass or glass fiber as the gap material dispersed or mixed in the seal material, it is possible to reduce the cell gap to be smaller than, for example, 2.0 μm. Therefore, according to the electro-optical device of the invention, it is possible to realize a narrow cell gap with relatively low manufacturing cost.

As described above, according to the electro-optical device of the invention, it is possible to reduce the step difference between the region in which the coloring layer is formed on one substrate and the region in which the coloring layer is not formed, which is generated due to the thickness of the coloring layer. In addition, by using the gap material having, for example, the diameter of about 2.0 μm and a relatively low cost, such as bead-shaped glass or glass fiber as the gap material dispersed or mixed in the seal material, it is possible to realize a narrow cell gap with relatively low manufacturing cost. As a result, according to the electro-optical device of the invention, it is possible to display a high-quality image.

In an aspect of the electro-optical device of the invention, the seal material may include a gap material which controls a gap between the pair of substrates, and, when the thickness of the electro-optical material is G [μm] and the size of a step difference between the coloring layer upper surface and the seal region surface is d [μm], the equation $G+d \geqq 2.0$ may be satisfied.

According to this aspect, for example, even when the bead-shaped gap material having, for example, the diameter of about 2.0 μm is used as the gap material, the depth of the concave portion is adjusted according to the thickness of the coloring layer such that the size d of the step difference is, for example, about 1.2 μm, and thus the thickness (that is, the cell gap) G of the electro-optical material is, for example, set to about 0.8 μm. That is, according to this aspect, by using for example a relatively cheap bead-shaped gap material with the diameter of 2.0 μm or more, it is possible to reduce the cell gap to be smaller than 2.0 μm with certainty.

In another aspect of the electro-optical device of the invention, the concave portion may be formed by removing at least one of one substrate and an insulating film formed on one substrate.

According to this aspect, the concave portion of one substrate is formed by performing, for example, an etching process with respect to one substrate (or with respect to the insulating film formed on one substrate). Accordingly, it is possible to easily form the concave portion.

In another aspect of the electro-optical device of the invention, a step difference reduction film provided so as to define the concave portion in a region including the seal region of one substrate and to reduce a step difference between the coloring layer upper surface and the seal region surface may be further included.

According to this aspect, the step difference reduction film is provided so as to define the concave portion in the region including the seal region on one substrate (typically, the peripheral region located at the periphery of the region in which the electro-optical material is provided). By providing the step difference reduction film, it is possible to easily form the concave portion in one substrate without engraving one substrate, that is, without performing the etching process with respect to one substrate.

In the aspect of the invention further including the step difference reduction film, the step difference reduction film may be formed of any one of an insulating film, a metal film and photoresist.

In this case, it is possible to suitably form the step difference reduction film.

According to another aspect of the invention, there is provided a color filter substrate including: a substrate; a concave portion provided in the substrate; and a coloring layer provided in the concave portion and more protruding than a substrate surface in which the concave portion is not formed.

According to another aspect of the invention, there is provided a color filter substrate including: a substrate; an insulating film provided on the substrate; a concave portion formed by removing a portion of the insulating film; and a coloring layer provided in the concave portion and more protruding than an insulating film upper surface in which the concave portion is not formed.

According to another aspect of the invention, there is provided a first method of manufacturing an electro-optical device including a pair of substrates, an electro-optical material sandwiched between the pair of substrates, and a seal material disposed in a seal region located at the periphery of a region in which the electro-optical material is provided on the pair of substrates so as to bond the pair of substrate to each other, between the pair of substrates, the method including forming a concave portion in the region in which the electro-optical material is provided on one substrate, forming a coloring layer in the concave portion such that a coloring layer upper surface of the coloring layer facing the electro-optical material is nearer the other substrate than a seal region surface overlapping with the seal material on one substrate; and bonding one substrate, in which the concave portion and the coloring layer are formed, and the other substrate by the seal material in the seal region.

According to the first method of manufacturing the electro-optical device of the invention, it is possible to manufacture the electro-optical device of the invention. In particular, in the forming of the coloring layer, the coloring layer is formed in the concave portion on one substrate such that the coloring layer upper surface is nearer the other substrate rather than the seal region surface on one substrate. Accordingly, it is possible to reduce the step difference between the region in which the coloring layer is formed on one substrate and the region in which the coloring layer is not formed, which is generated due to the thickness of the coloring layer. In addition, by using the gap material having, for example, the diameter of about 2.0 μm and relatively low cost, such as bead-shaped glass or glass fiber as the gap material dispersed or mixed in the seal material, it is possible to manufacture an electro-optical device with a narrow cell gap and relatively low manufacturing cost.

In an aspect of the first method of manufacturing the electro-optical device according to the invention, the forming of the concave portion may include forming the concave portion by performing an etching process with respect to one substrate.

According to this aspect, it is possible to easily form the concave portion in one substrate.

In another aspect of the first method of manufacturing the electro-optical device according to the invention, the forming of the concave portion may include forming a step difference reduction film for reducing a step difference between the coloring layer upper surface and the seal region surface so as to define the concave portion in a region including the seal region of one substrate.

According to this aspect, by providing the step difference reduction film, it is possible to easily form the concave portion in one substrate without engraving one substrate, that is, without performing the etching process with respect to one substrate.

According to another aspect of the invention, there is provided a second method of manufacturing an electro-optical device including a pair of substrates, an electro-optical material sandwiched between the pair of substrates, and a seal material disposed in a seal region located at the periphery of a region in which the electro-optical material is provided on the pair of substrates so as to bond the pair of substrate to each other, between the pair of substrates, the method including forming a coloring layer in the region in which the electro-optical material is provided on one substrate; forming a concave portion in one substrate by forming a step difference reduction film such that a coloring layer upper surface of the coloring layer facing the electro-optical material is nearer the other substrate than an upper surface of the step difference reduction film overlapping with the seal material of the step difference reduction film; and bonding one substrate, in which the concave portion and the coloring layer are formed, and the other substrate by the seal material in the seal region.

According to the second method of manufacturing the electro-optical device of the invention, it is possible to manufacture the electro-optical device of the invention. In particular, in the forming of the concave portion, in the region including the seal region on one substrate, the concave portion is formed in one substrate by forming the step difference reduction film in the region including the seal region of one substrate such that the coloring layer upper surface facing the electro-optical material is nearer to the other substrate of the pair of substrates than the step difference reduction film upper surface overlapping with the seal material of the step difference reduction film, for example, by forming any one of an insulating film, a metal film and photoresist. Accordingly, it is possible to reduce the step difference between the region in which the coloring layer is formed on one substrate and the region in which the coloring layer is not formed, which is generated due to the thickness of the coloring layer. In addition, by using the gap material having for example, the diameter of about 2.0 μm and relatively low cost, such as bead-shaped glass or glass fiber as the gap material dispersed or mixed in the seal material, it is possible to manufacture an electro-optical device with a narrow cell gap and with a relatively low manufacturing cost.

According to another aspect of the invention there is provided an electronic apparatus including the above-described electro-optical device (including the aspects thereof).

Since the electronic apparatus of the invention includes the electro-optical device of the invention, it is possible to realize various types electronic apparatus capable of realizing a high-quality image display, such as a projection type display device, a television set, a mobile telephone, an electronic organizer, a word processor, a viewfinder-type or direct-view monitor type video tape recorder, a workstation, a videophone, a POS terminal, and a touch-panel-equipped device.

The operations and other features of the invention will be apparent from the following description of the exemplary embodiments.

BRIEF DESCRIPTION OF THE DRAWINGS

The invention will be described with references to the accompanying drawings, wherein like numbers reference like elements.

DESCRIPTION OF EXEMPLARY EMBODIMENTS

Hereinafter, embodiments of the invention will be described with reference to the accompanying drawings.

1. Electro-Optical Device

In the following embodiments, for example, a TFT active matrix driving type liquid crystal device including a driving circuit mounted therein, which is an example of an electro-optical device according to the invention, will be described.

1-1. First Embodiment

A liquid crystal device according to a first embodiment of the invention will be described with reference to FIGS. 1 to 3.

First, the overall configuration of the liquid crystal device according to the present embodiment will be described with reference to FIGS. 1 and 2. FIG. 1 is a plan view showing the overall configuration of the liquid crystal device according to the present embodiment, and FIG. 2 is a cross-sectional view taken along line II-II of FIG. 1. In FIG. 2, the scale of each member is differentiated from each other in order that each member has a size capable of being identified in the view.

Figure 1:
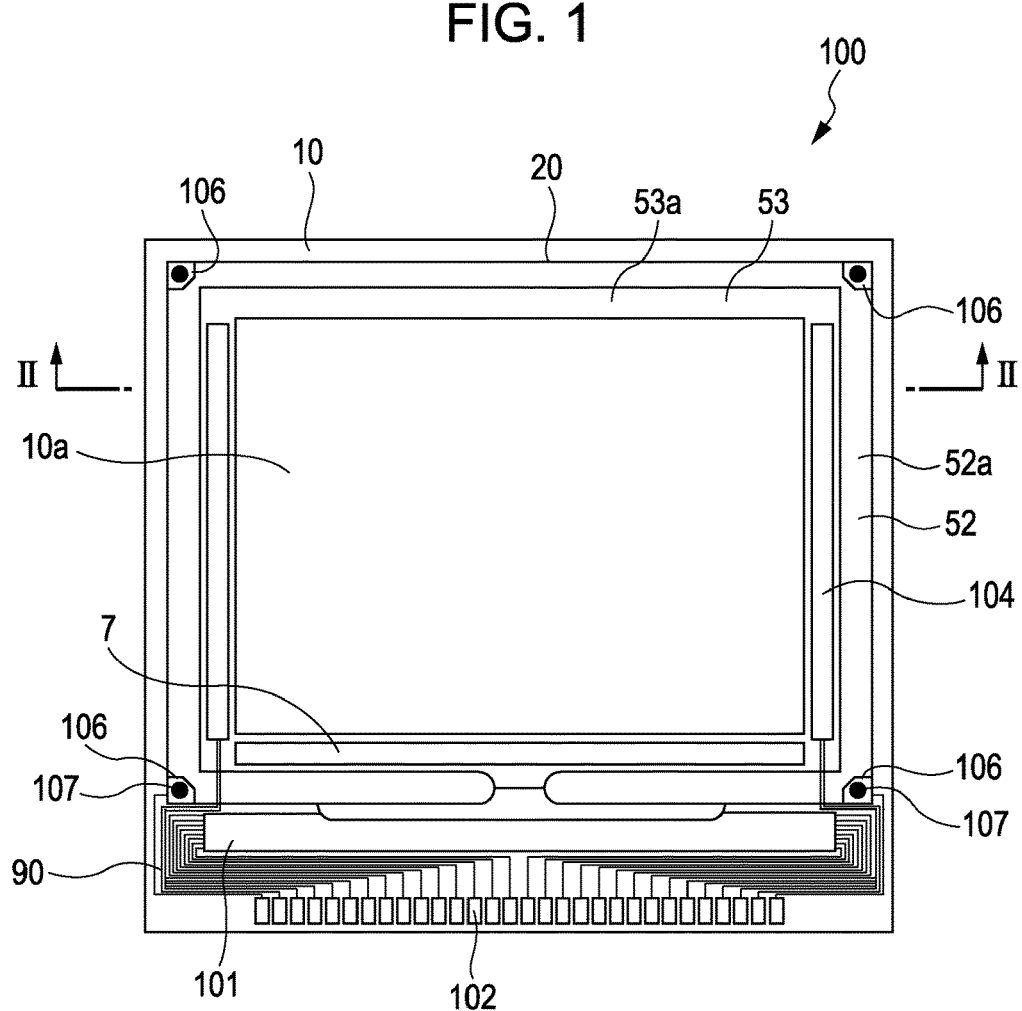
FIG. 1 is a plan view showing the overall configuration of a liquid crystal device according to a first embodiment of the invention.
Figure 2:
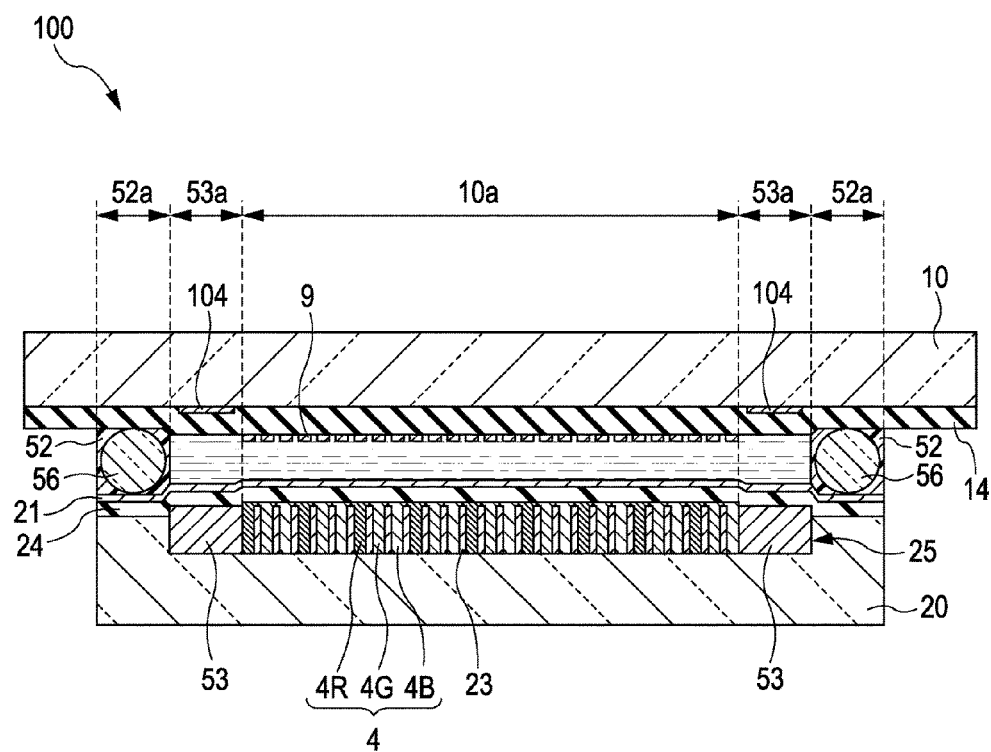
FIG. 2 is a cross-sectional view taken along line II-II of FIG. 1.

In FIGS. 1 and 2, the liquid crystal device 100 according to the present embodiment includes a TFT array substrate 10 and a counter substrate 20 which face each other. The TFT array substrate 10 is, for example, a transparent substrate such as a quartz substrate or a glass substrate, or a silicon substrate. The counter substrate 20 is, for example, a transparent substrate formed of the same material as the TFT array substrate 10. A liquid crystal layer 50 is enclosed between the TFT array substrate 10 and the counter substrate 20, and the TFT array substrate 10 and the counter substrate 20 are bonded to each other by a seal material 52 provided in a seal region 52*a* located at the periphery of an image display region 10*a*. The image display region 10*a* is a region where light contributing to a display is emitted and an image display is performed.

The TFT array substrate 10 and the counter substrate 20 are an example of "a pair of substrates" according to the invention, the counter substrate 20 is an example of "one substrate" according to the invention, and the TFT array substrate 10 is an example of "the other substrate" according to the invention.

The seal material 52 is formed of, for example, ultraviolet curing resin or thermosetting resin for bonding both substrates, is coated on the TFT array substrate 10 and is cured by irradiating an ultraviolet ray or performing heating treatment in a manufacturing process. In the seal material 52, a gap material 56 for holding a gap (inter-substrate gap) between the TFT array substrate 10 and the counter substrate 20 at a predetermined value, such as glass fiber or glass beads, is dispersed.

In FIG. 1, a frame light-shielding film 53 defining a frame region 53*a* of the image display region 10*a* is provided on the counter substrate 20 at the inside of the seal region 52*a* in which the seal material 52 is provided. The frame light-shielding film 53 is formed of, for example, a light-shielding material such as a light-shielding metal film. As described later with reference to FIG. 2, a concave portion 25 is formed in a side of the counter substrate 20 facing the TFT array substrate 10 (that is, an upper side of FIG. 2), and the frame light-shielding film 53 is formed in the concave portion 25.

In a region located outside the seal region 52a in which the seal material 52 is provided on the TFT array substrate 10, a data line driving circuit 101 and an external circuit connection terminal 102 are provided along one side of the TFT array substrate 10. A sampling circuit 7 is provided inside the seal region 52a along one side so as to overlap with the frame light-shielding film 53 when viewed from a normal direction of the TFT array substrate 10. Scan line driving circuits 104 are provided inside the seal region 52a along two sides adjacent to one side so as to overlap with the frame light-shielding film 53 when viewed from the normal direction of the TFT array substrate 10. On the TFT array substrate 10, upper/lower conductive terminals 106 for electrically connecting both substrates via upper/lower conductive materials 107 are provided in regions which face four corners of the counter substrate 20. Accordingly, the TFT array substrate 10 and the counter substrate 20 may be electrically conducted.

On the TFT array substrate 10, routed wires 90 for electrically connecting the external circuit connection terminal 102, the data line driving circuit 101, the scan line driving circuits 104 and the upper/lower conductive terminals 106 are formed.

In FIG. 2, on the TFT array substrate 10, a laminated structure made of pixel switching Thin Film Transistors (TFTs), wires such as scan lines and data lines, and various types of electronic elements configuring circuits such as the scan line driving circuits 104 and the data line driving circuit 101 is formed. In the image display region 10a, pixel electrodes 9 made of a transparent material such as Indium Tin Oxide (ITO) are provided in a matrix on the pixel switching TFTs or the wires such as the scan lines and the data lines with an insulating film 14 interposed therebetween. An alignment film (not shown) subjected to an alignment process such as a rubbing process is formed on the pixel electrodes 9.

Meanwhile, the concave portion 25 is formed in the side (that is, the side facing the liquid crystal layer 50) of the counter substrate 20 facing the TFT array substrate 10, and color filter layers 4 (that is, color filter layers 4R, 4G and 4B) of RGB (that is, red, green and blue) are formed in the concave portion 25 in each sub pixel. The color filter layers 4 are an example of a "coloring layer" according to the invention.

The concave portion 25 is formed in the counter substrate 20 such that a region inner than the seal region 52a (that is, a region including the image display region 10a and the frame region 53a) is recessed. The concave portion 25 is formed by, for example, performing an etching process with respect to the counter substrate 20. In addition to or instead of the counter substrate 20, the concave portion 25 may be formed by performing an etching process with respect to the insulating film formed on the counter substrate 20.

The red color filter layer 4R is a color filter layer passing through only red light (that is, light of a wavelength of, for example, 625 to 740 nm), the green color filter layer 4G is a color filter layer passing through only green light (that is, light of a wavelength of, for example, 500 to 565 nm), and the blue color filter layer is a color filter layer passing through only blue light (that is, light of a wavelength of, for example, 450 to 485 nm). For example, a set of three sub pixels including a sub pixel corresponding to the red color filter layer, a sub pixel corresponding to the green color filter layer, and a sub pixel corresponding to the blue color filter layer constructs one pixel (that is, one color pixel or full-color pixel).

In the concave portion 25 formed in the counter substrate 20, a black matrix 23 defining the boundary of the adjacent color filter layers 4 is formed of a light-shielding material for example light-shielding metal such as aluminum). The black matrix 23 is patterned on the counter substrate 20 in a lattice shape in plan view. By forming the black matrix 23 along spaces between the adjacent sub pixels in the image display region 10a, a mixed color between the sub pixels or a contrast ratio of a display image is improved.

Although not shown in FIG. 2, the insulating film 27 (see FIG. 3) is formed of the insulating material such as Boron Silicate Glass (BSG) between the black matrix 23 and the color filter layers 4 in the laminated structure on the counter substrate 20. The insulating film 27 functions as a protective film for protecting the black matrix 23. In detail, in the manufacturing process, the black matrix 23 formed of, for example, aluminum can be prevented from being corroded by an alkali developer used in a photo-etching process performed after the black matrix 23 is formed, using the insulating film 27.

An overcoat film 24 is formed on the color filter layers 4 of the counter substrate 20 so as to cover the substantially overall surface of the counter substrate 20 and is formed of, for example, an insulating material such as acrylic resin or silicon oxide ($SiO_2$). The overcoat film 24 functions as a protective film for protecting the color filter layers 4.

A counter electrode 21 formed of a transparent material such as ITO is formed on the overcoat film 24 so as to be the opposite to the plurality of pixel electrodes 9 over the substantially overall surface of the counter substrate 20 (for example, solidly). An alignment film (not shown) subjected to an alignment process such as a rubbing is formed on the counter electrode 21.

The liquid crystal layer 50 is formed of a mixture of one type or several types of nematic liquid crystal as an example of an "electro-optical material" according to the invention, and is in a predetermined alignment state between a pair of alignment films (that is, the alignment film on the pixel electrodes 9 and the alignment film on the counter electrode 21).

Although not shown herein, a test circuit or a test pattern for testing the quality and the defect of the liquid crystal device during manufacture or before shipment may be formed on the TFT array substrate 10, in addition to the data line driving circuit 101 and the scan line driving circuits 104.

Next, the configuration of the counter substrate of the liquid crystal device according to the present embodiment will be described in detail with reference to FIG. 3 in addition to FIGS. 1 and 2. FIG. 3 is a partial enlarged view of a portion of the cross-sectional view shown in FIG. 2.

Figure 3:
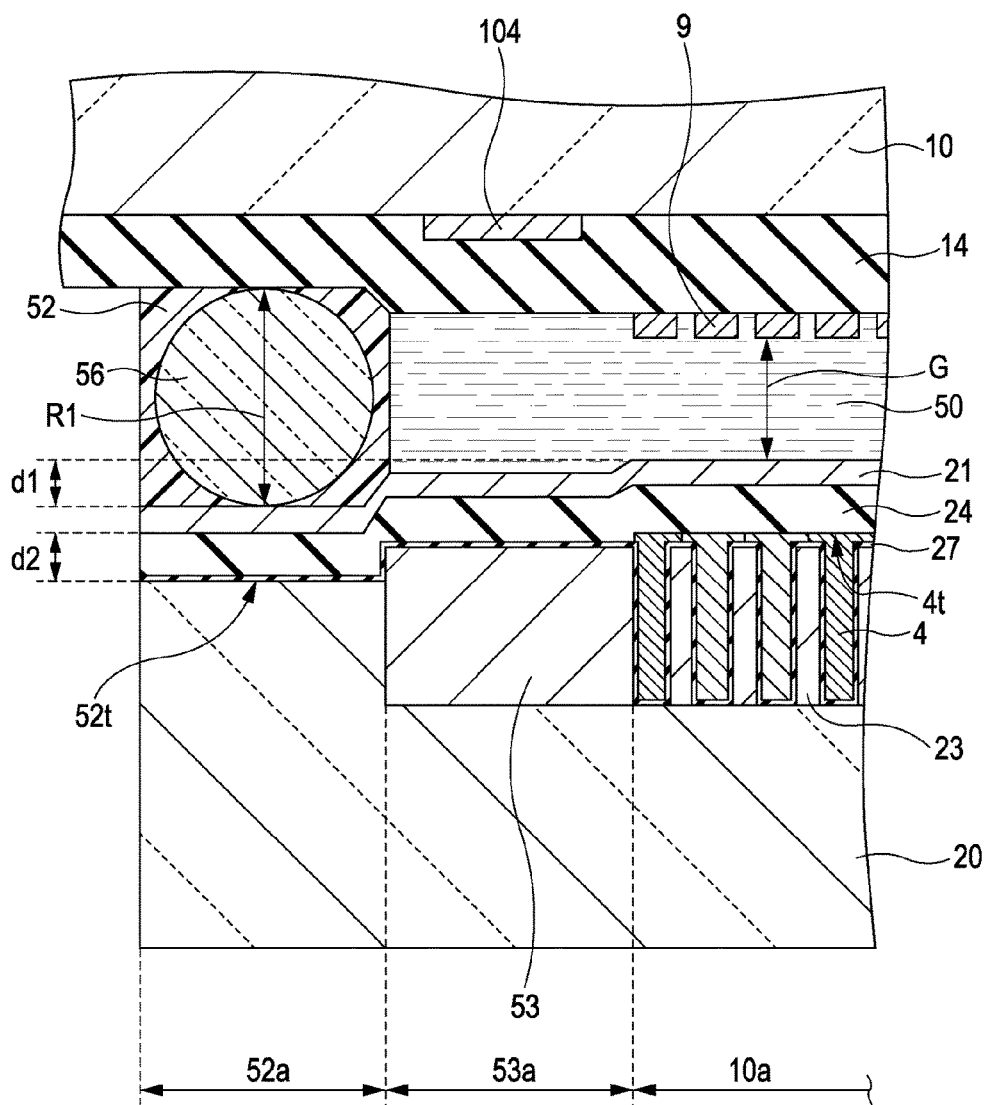
FIG. 3 is a partial enlarged view of a portion of the cross-sectional view shown in FIG. 2.

In FIGS. 2 and 3, in the present embodiment, as described above, the color filter layers 4 and the frame light-shielding film 53 are provided in the concave portion 25 formed in the counter substrate 20. Accordingly, it is possible to reduce a step difference between the region in which the color filter layers 4 are formed on the counter substrate 20 (that is, the image display region 10a) or the region in which the frame light-shielding film 53 is formed and the region in which both the color filter layers 4 and the frame light-shielding film 53 are not formed (that is, the seal region 52a), which is generated due to the thickness (that is, layer thickness) of the color filter layers 4 or the thickness (that is, film thickness) of the frame light-shielding film 53. Accordingly, for example, when the alignment film is formed on the counter electrode 21 formed on the uppermost layer side of the counter substrate 20 by a coating method, it is possible to reduce coating unevenness generated due to the step difference between the region in which the color filter layers 4 or the frame light-shielding film 53 is formed on the counter substrate 20 (in other words, the region inner than the seal region 52) and the region in which the color filter layers 4 or the frame light-shielding film 53 is not formed (in other words, the seal region 52a). Thus, it is possible to reduce a display failure due to coating unevenness on the counter substrate 20.

In the present embodiment, in particular, a color filter layer upper surface 4t of the color filter layers 4 facing the liquid crystal layer 50 is formed nearer the TFT array substrate 10 than a seal region surface 52t, which is the surface of the seal region 52a, of the surface of the counter substrate 20 facing the liquid crystal layer 50. That is, in the present embodiment, in particular, the color filter layers 4 are formed such that the color filter layer upper surface 4t is nearer to the TFT array substrate 10 than the seal region surface 52t overlapping with the seal material 52 of the counter substrate 20 in the concave portion 25 formed in the counter substrate 20. In more detail, the thickness of the color filter layers 4 and the depth of the concave portion 25 are adjusted such that the step difference d1 between the region, in which the color filter layers 4 are formed on the counter substrate 20, and the seal region 52a, in which the color filter layers 4 are not formed, and the thickness (that is, the cell gap) G of the liquid crystal layer 50 satisfy a relationship of (size of the cell gap G)+(size of the step difference d1)≧2.0 µm. In other words, the thickness of the color filter layers 4 and the depth of the concave portion 25 are adjusted such that the step difference d2 between the color filter layer upper surface 4t and the seal region surface 52t and the cell gap G satisfies a relationship of (size of the cell gap G)+(size of the step difference d2)≧2.0 µm.

Accordingly, even when the diameter R1 of the bead-shaped gap material 56 included in the seal material 52 is about 2.0 µm, the cell gap G may be, for example, smaller than about 2.0 µm. In other words, the cell gap G can be, for example, smaller than 2.0 µm using the gap material having a diameter of about 2.0 µm and relatively low cost, such as bead-shaped glass or glass fiber, as the gap material 56 dispersed or mixed in the seal material 52. For example, even when the bead-shaped gap material having a diameter of about 2.0 µm is used as the gap material 56, the depth of the concave portion 25 is adjusted according to the thickness of the color filter layers 4 such that the size of the step difference d1 (or the step difference d2) is, for example, about 1.2 µm. Thus, the size of the cell gap G may be about 0.8 µm. Therefore, according to the liquid crystal device 100 of the present embodiment, it is possible to realize a narrow cell gap with relatively low manufacturing cost.

As described above, according to the liquid crystal device 100 according to the present embodiment, it is possible to reduce the step difference between the region, in which the color filter layers 4 are formed on the counter substrate 20, and the region, in which the color filter layer 4 is not formed, which is generated due to the thickness of the color filter layers 4. Furthermore, it is possible to realize a narrow cell gap with relatively low manufacturing cost.

1-2. Second Embodiment

Figure 4:
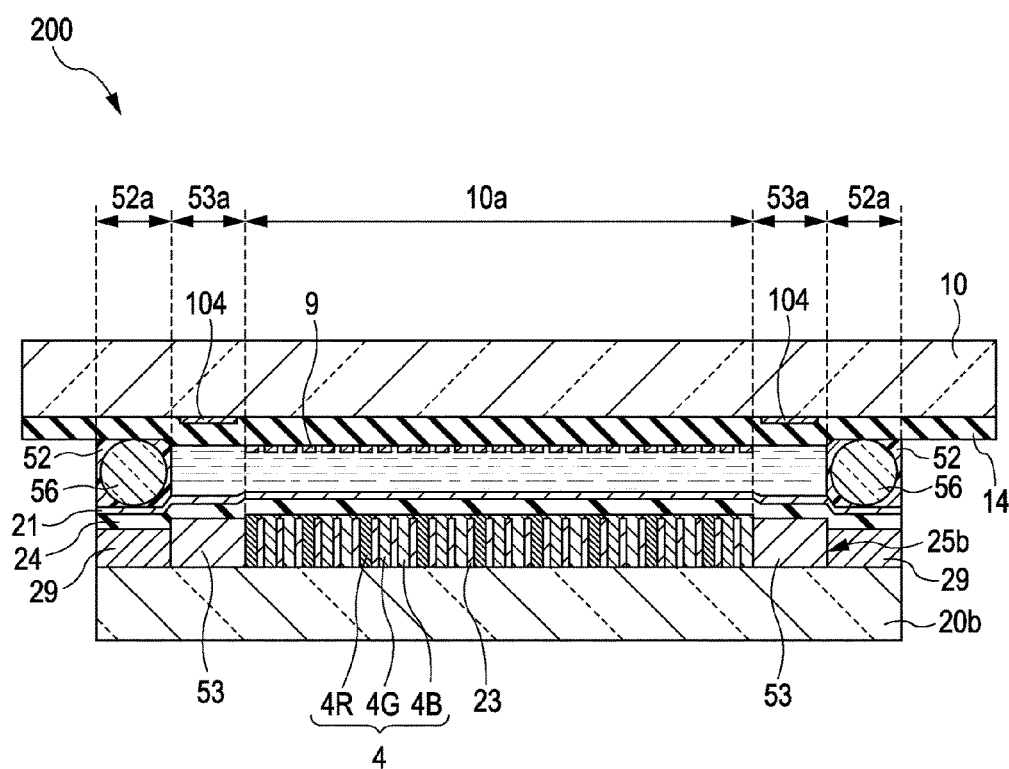
FIG. 4 is a cross-sectional view having the same purpose of FIG. 2 according to a second embodiment of the invention.

A liquid crystal device according to a second embodiment of the invention will be described with reference to FIG. 4. FIG. 4 is a cross-sectional view having the same purpose of FIG. 2 according to a second embodiment of the invention. In FIG. 4, the same components as the first embodiment shown in FIGS. 1 to 3 are denoted by the same reference numerals and the detailed description thereof will be properly omitted.

In FIG. 4, the liquid crystal device 200 according to the second embodiment is different from the liquid crystal device 100 according to the first embodiment in that a counter substrate 20b and a step difference reduction film 29 are included instead of the counter substrate 20 in the first embodiment, and the other configurations are similar to those of the liquid crystal device 100 according to the first embodiment.

In FIG. 4, in the present embodiment, in particular, the step difference reduction film 29 is formed such that a concave portion 25b is defined in a seal region 52a on the counter substrate 20b formed of a flat transparent substrate, and color filter layers 4 or a frame light-shielding film 53 is formed in the concave portion 25b. The step difference reduction film 29 is, for example, formed of an insulating film such as silicon oxide or silicon nitride so as to reduce the step difference between a color filter layer upper surface and a seal region surface. The step difference reduction film 29 may be, for example, formed of a conductive film such as an ITO film, a metal film or photoresist, instead of the insulating film.

Therefore, according to the liquid crystal device 200 of the present embodiment, similar to the liquid crystal device 100 according to the first embodiment, it is possible to reduce the step difference between the region in which the color filter layers 4 are formed on the counter substrate 20 or the region in which the frame light-shielding film 53 is formed region and the region in which both the color filter layers 4 and the frame light-shielding film 53 are not formed, which is generated due to the thickness of the color filter layers 4 or the thickness of the frame light-shielding film 53 and to realize a narrow cell gap with relatively low manufacturing cost.

Although, in the first and second embodiments, the color filter layers 4 are formed on the counter substrate 20 (or 20b) (that is, the counter substrate functions as a color filter substrate), the invention is applicable to the case where an electro-optical device has a so-called on-chip color filter structure (that is, a structure in which the color filter layer is formed on the same substrate as the pixel electrode).

2. Method of Manufacturing Electro-Optical Device

Methods of manufacturing the liquid crystal devices according to the above-described embodiments will be described with reference to FIGS. 5 to 7.

2-1. Manufacturing Method 1

An example of the method of manufacturing the liquid crystal device according to the first embodiment will be described with reference to FIG. 5. FIG. 5 is a sequential process cross-sectional view showing an example of the method of manufacturing the liquid crystal device according to the first embodiment of the invention in correspondence with the cross-sectional view shown in FIG. 2. The method of manufacturing the counter substrate 20 which is the feature of the invention will be mainly described and the other portion of the manufacturing method will be properly omitted.

Figure 5A:
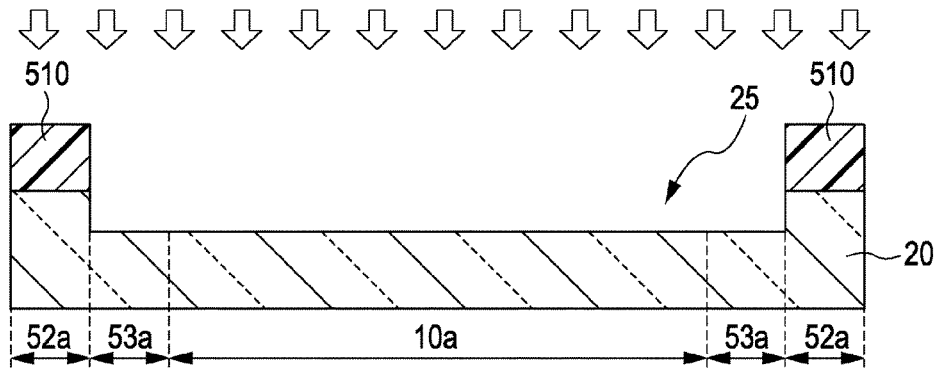
FIG. 5 is a sequential process cross-sectional view showing an example of a method of manufacturing the liquid crystal device according to the first embodiment of the invention.

First, in a process shown in FIG. 5A, the concave portion 25 is formed in the counter substrate 20 formed of the transparent substrate in a region inner than the seal region 52a. In detail, a resist film 510 is formed so as to cover the seal region 52a on the counter substrate 20 formed of the transparent substrate, and an etching process is performed with respect to the counter substrate 20 using this resist film 510 as a mask. Accordingly, the concave portion 25 is formed in the counter substrate 20 such that the region inner than the seal region 52a (that is, the image display region 10a and the frame region 53a) is recessed. Thereafter, the resist film 510 is removed. In the present embodiment, the depth of the concave portion 25 is about 1.0 µm.

Figure 5B:
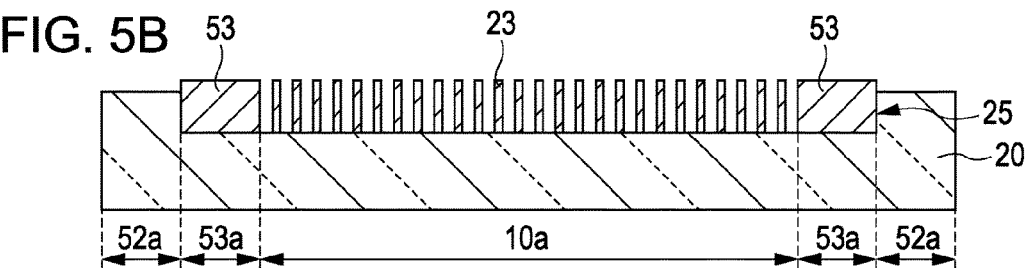

Next, in a process shown in FIG. 5B, a light-shielding metal film such as aluminum is formed on the overall surface of the counter substrate 20 by a sputtering method, and this light-shielding metal film is patterned by a photolithographic method and an etching method such that the black matrix 23 of a lattice shape is formed in the image display region 10a in the concave portion 25 and the frame light-shielding film 53 is formed in the frame region 53a in the concave portion 25. In the present embodiment, the black matrix 23 and the frame light-shielding film 53 are formed with a thickness of about 1.5 µm, in order to sufficiently exhibit a light-shielding property.

Figure 5C:
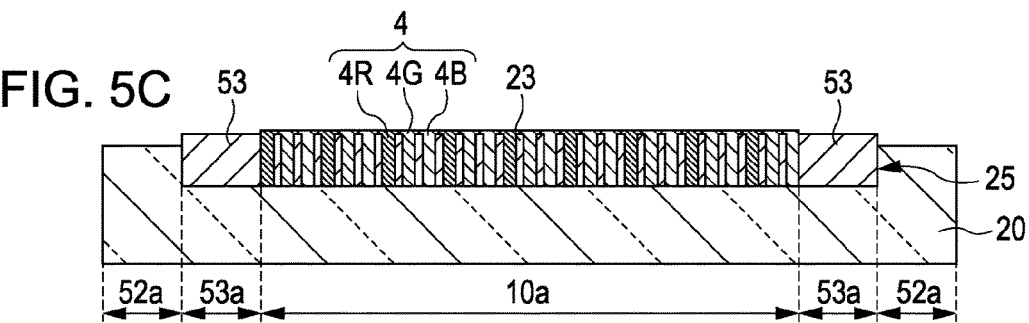

Next, in a process shown in FIG. 5C, the color filter layers 4 of R (red), G (green) and B (blue) are formed in the image display region 10a of the counter substrate 20. For example, first, color resist including photoresist corresponding to R is uniformly coated on the counter substrate 20. Thereafter, exposure and patterning are performed so as to remove unnecessary color resist such that the color filter layer 4R is completed. Next, color resist including photoresist corresponding to G is coated on the color filter layer 4R formed previously and the counter substrate 20, and unnecessary color resist is removed such that the color filter layer 4G is completed. Similarly, color resist including photoresist corresponding to B is coated on the color filter layers 4R and 4G formed previously and the counter substrate 20, and unnecessary color resist is removed such that the color filter layer 4B is completed. The color filter layers 4 of RGB are completed in the image display region 10a of the counter substrate 20.

In the present embodiment, the color filter layers 4 are formed with a thickness of about 1.8 µm, in order to sufficiently exhibit a color filter function.

Figure 5D:
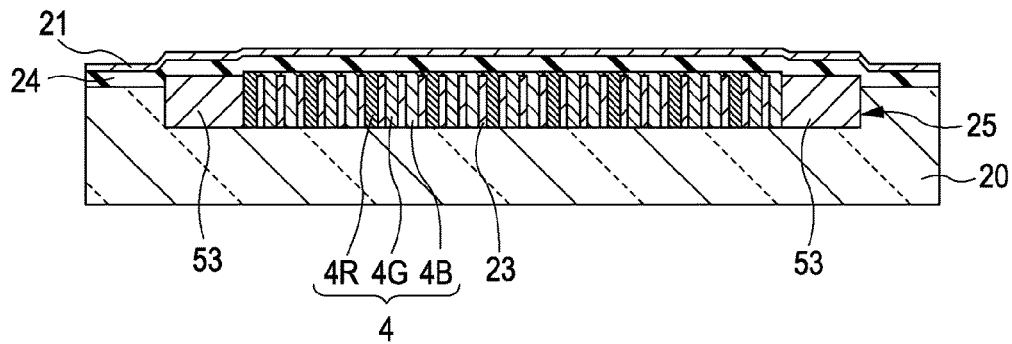

Next, in a process shown in FIG. 5D, the overcoat film 24 is formed so as to cover the substantially overall surface of the counter substrate 20. The overcoat film 24 is formed by uniformly coating a transparent insulating material such as acrylic resin or silicon oxide with a predetermined film thickness.

Subsequently, the counter electrode 21 is formed on the overcoat film 24. The counter electrode 21 is formed of a transparent material such as ITO.

Subsequently, the alignment film (not shown) subjected to the alignment processes such as the rubbing process is formed on the counter electrode 21 such that the counter substrate is completed.

The completed counter substrate 20 is bonded to the TFT array substrate 10 (see FIG. 2), on which devices, wires or the like are separately formed, by the seal material 52 (see FIG. 2) disposed in the seal region 52a, and the liquid crystal layer 50 is sandwiched between both substrates, such that the liquid crystal device 100 according to the first embodiment is completed. In the completed liquid crystal device 100, it is possible to reduce the step difference between the region in which the color filter layers 4 are formed on the counter substrate 20 (that is, the image display region 10a) or the region in which the frame light-shielding film 53 is formed and the region in which both the color filter layers 4 and the frame light-shielding film 53 are not formed (that is, the seal region 52a), and to decrease the size of the cell gap to be smaller than, for example, about 2.0 µm even when the diameter of the bead-shaped gap material 56 included in the seal material 52 is about 2.0 µm. In the present embodiment, the size of the cell gap G is about 0.8 µm.

2-2 Manufacturing Method 2

An example of the method of manufacturing the liquid crystal device according to the second embodiment will be described with reference to FIG. 6. FIG. 6 is a sequential process cross-sectional view showing an example of the method of manufacturing the liquid crystal device according to the second embodiment of the invention in correspondence with the cross-sectional view shown in FIG. 4. The method of manufacturing the counter substrate 20b which is the feature of the invention will be mainly described and the other portion of the manufacturing method will be properly omitted.

Figure 6A:
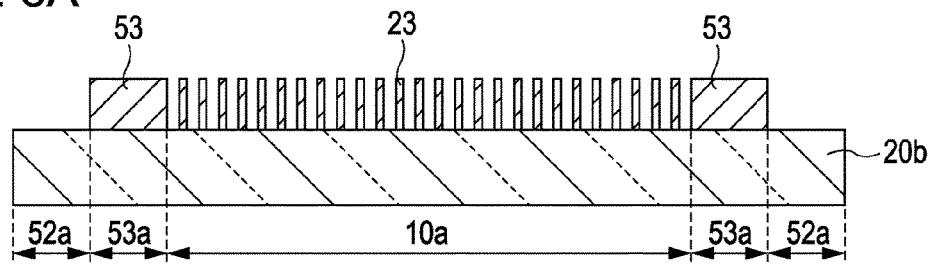
FIG. 6 is a sequential process cross-sectional view showing an example of a method of manufacturing the liquid crystal device according to the second embodiment of the invention.

First, in a process shown in FIG. 6A, a light-shielding metal film such as aluminum is formed on the overall surface of the counter substrate 20b formed of a flat transparent substrate, and this light-shielding metal film is patterned by a photolithographic method and an etching method such that the black matrix 23 of a lattice shape is formed in the image display region 10a of the counter substrate 20b and the frame light-shielding film 53 is formed in the frame region 53a of the counter substrate 20b.

Figure 6B:
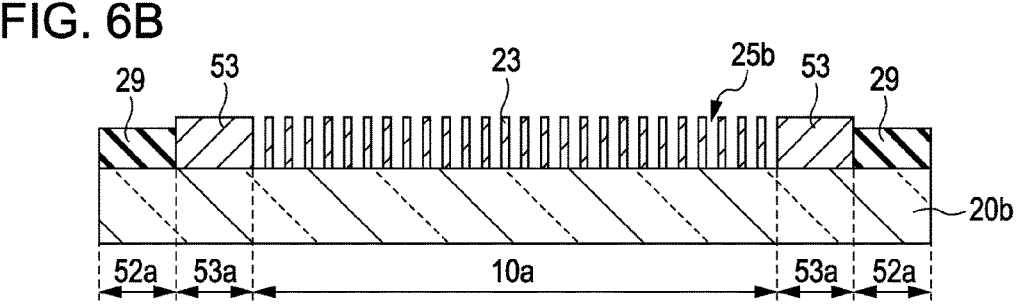

Next, in a process shown in FIG. 6B, the step difference reduction film 29 is formed by the insulating film such as silicon oxide or silicon nitride in the seal region 52a of the counter substrate 20b. The concave portion 25b is defined by the step difference reduction film 29 and the black matrix 23 and the frame light-shielding film 53 are disposed in the concave portion 25b. In the present embodiment, the thickness of the step difference reduction film 29 is about 1.0 µm and the depth of the concave portion 25b is about 1.0 µm.

Figure 6C:
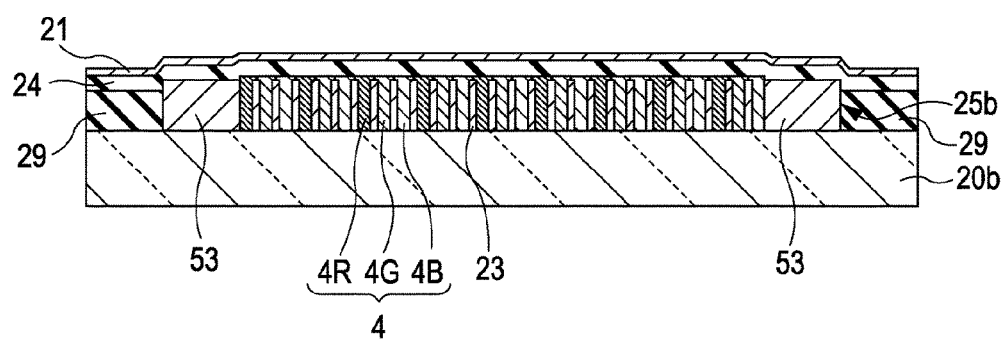

Next, in a process shown in FIG. 6C, the color filter layers 4 of RGB are formed in the image display region 10a of the counter substrate 20b. In the present embodiment, the color filter layers 4 are formed with a thickness of about 1.8 µm.

Next, the overcoat film 24 is formed so as to cover the substantial overall surface of the counter substrate 20b and, thereafter, the counter electrode 21 is formed on the overcoat film 24. Subsequently, the alignment film (not shown) subjected to the alignment process such as the rubbing process is formed on the counter electrode 21 such that the counter substrate is completed. The completed counter substrate 20b is bonded to the TFT array substrate 10 (see FIG. 4), on which devices, wires or the like are separately formed, by the seal material 52 (see FIG. 4) disposed in the seal region 52a, and the liquid crystal layer 50 is sandwiched between both substrates, such that the liquid crystal device 200 according to the second embodiment is completed.

2-3 Manufacturing Method 3

Another example of the method of manufacturing the liquid crystal device according to the second embodiment will be described with reference to FIG. 7. FIG. 7 is a sequential process cross-sectional view showing another example of the method of manufacturing the liquid crystal device according to the second embodiment of the invention in correspondence with the cross-sectional view shown in FIG. 4. The method of manufacturing the counter substrate 20b which is the feature of the invention will be mainly described and the other portion of the manufacturing method will be properly omitted.

The manufacturing method of this example is different from the example of the manufacturing method described with reference to FIG. 6 in that the step difference reduction film 29 is formed after the color filter layers 4 are formed, and is similar to the manufacturing method described with reference to FIG. 6 in the other configuration. In the example of the manufacturing method described with reference to FIG. 6, the step difference reduction film 29 is formed before the color filter layers 4 are formed.

Figure 7A:
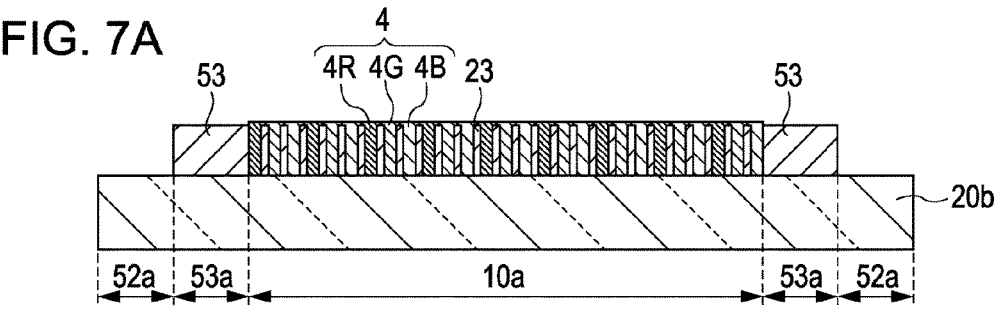
FIG. 7 is a sequential process cross-sectional view showing another example of the method of manufacturing the liquid crystal device according to the second embodiment of the invention.

First, in a process shown in FIG. 7A, a light-shielding metal film such as aluminum is formed on the overall surface of the counter substrate 20b formed of a flat transparent substrate, and this light-shielding metal film is patterned by a photolithographic method and an etching method such that the black matrix 23 having a lattice shape is formed in the image display region 10a of the counter substrate 20b and the frame light-shielding film 53 is formed in the frame region 53a of the counter substrate 20b.

Subsequently, the color filter layers 4 of RGB are formed in the image display region 10a of the counter substrate 20b. In the present embodiment, the color filter layers 4 are formed with a thickness of about 1.8 μm.

Figure 7B:
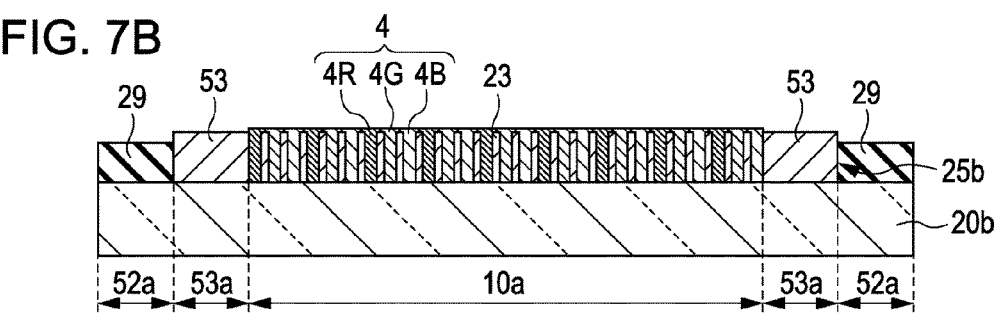

Next, in a process shown in FIG. 7B, the step difference reduction film 29 is formed by the insulating film such as silicon oxide or silicon nitride in the seal region 52a of the counter substrate 20b. The concave portion 25b is defined by the step difference reduction film 29, and the color filter layers 4, the black matrix 23 and the frame light-shielding film 53 are disposed in the concave portion 25b. In the present embodiment, the thickness of the step difference reduction film 29 about 1.0 μm and the depth of the concave portion 25b is about 1.0 μm.

Figure 7C:
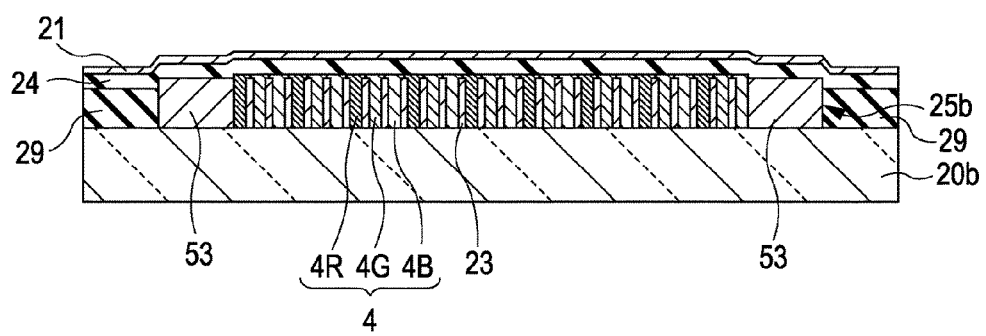

Next, in a process shown in FIG. 7C, the overcoat film 24 is formed so as to cover the substantially overall surface of the counter substrate 20b and, thereafter, the counter electrode 21 is formed on the overcoat film 24. Subsequently, the alignment film (not shown) subjected to the alignment process such as the rubbing process is formed on the counter electrode 21 such that the counter substrate is completed. The completed counter substrate 20b is bonded to the TFT array substrate 10 (see FIG. 4), on which devices, wires or the like are separately formed, by the seal material 52 (see FIG. 4) disposed in the seal region 52a, and the liquid crystal layer 50 is sandwiched between both substrates, such that the liquid crystal device 200 according to the second embodiment is completed.

3. Electronic Apparatus

Next, examples of applying the liquid crystal device, which is the above-described electro-optical device, to various types of electronic apparatus will be described.

Figure 8:
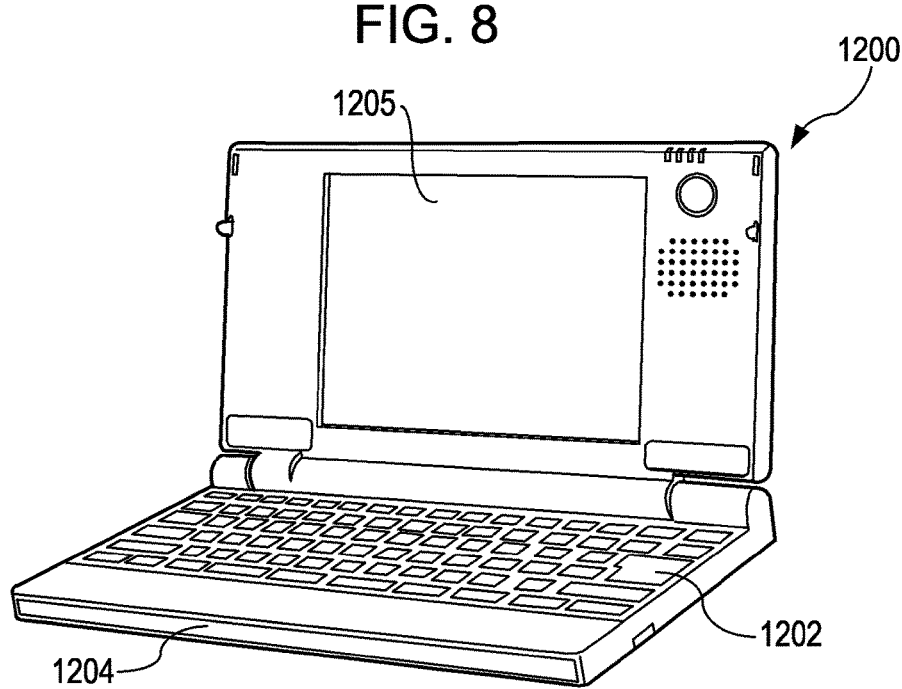
FIG. 8 is a perspective view showing the configuration of a personal computer which is an example of an electronic apparatus including an electro-optical device.

First, an example of applying the above-described liquid crystal device to a display unit of a personal computer (a so-called notebook type computer) will be described with reference to FIG. 8. FIG. 8 is a perspective view showing the configuration of this personal computer. As shown in FIG. 8, the personal computer 1200 includes a main body 1204 having a keyboard 1202 and a display unit 1205 to which the above-described liquid crystal device is applied.

Figure 9:
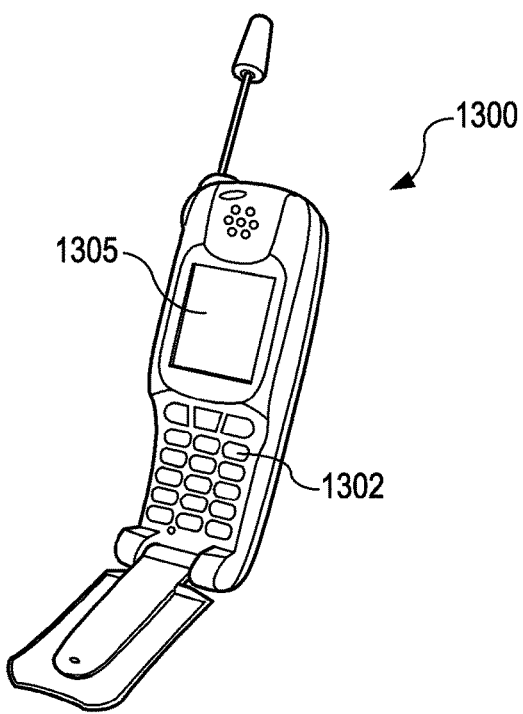
FIG. 9 is a perspective view showing the configuration of a mobile telephone which is an example of an electronic apparatus including an electro-optical device.

Next, an example of applying the above-described liquid crystal device to a display unit of a mobile telephone will be described with reference to FIG. 9. FIG. 9 is a perspective view showing the configuration of this mobile telephone. As shown in FIG. 9, the mobile telephone 1300 includes a plurality of operation buttons 1302 and a display unit 1305 to which the above-described liquid crystal device is applied.

As the electronic apparatus including the electro-optical device according to the invention, in addition to the electronic apparatus described in FIGS. 8 and 9, there are a projector, a viewfinder-type or direct-view monitor type video tape recorder, a car navigation system, a pager, an electronic organizer, an electronic calculator, a word processor, a workstation, a videophone, a POS terminal, a touch-panel-equipped device, and the like.

The invention is applicable to a Liquid Crystal On silicon (LCOS) in which a device is formed on a silicon substrate, a Plasma Display Panel (PDP), a Field Emission Display (FED or SED), an organic EL display, a Digital Micromirror Device (DMD), an electrophoresis device or the like, in addition to the liquid crystal devices described in the above-described embodiments.

The invention is not limited to the above-described embodiments and modification may be properly made without departing from the spirit of the invention as defined by the appended claims and the specification. An electro-optical device including such modifications, a method of manufacturing the electro-optical device, and an electronic apparatus including the electro-optical device are included in the technical range of the invention.

What is claimed is:

1. An electro-optical device comprising:
   a pair of substrates;
   an electro-optical material sandwiched between the pair of substrates;
   a seal material disposed in a seal region located at the periphery of a region in which the electro-optical material is provided on the pair of substrates so as to bond the pair of substrates to each other, between the pair of substrates;
   a concave portion provided on one substrate of the pair of substrates;
   a coloring layer provided in the concave portion, an upper surface of the coloring layer facing the electro-optical material being formed nearer to the other substrate of the pair of substrates than a seal region surface overlapping with the seal material on the one substrate,
   wherein:
   the seal material includes a gap material which controls a gap between the pair of substrates, and
   when the thickness of the electro-optical material is G [μm] and the size of a step difference between the coloring layer upper surface and the seal region surface is d [μm], the following equation is satisfied:

$G + d \geq 2.0$ μm.

2. The electro-optical device according to claim 1, wherein the concave portion is formed by removing at least one of a portion of the one substrate and a portion of an insulating film formed directly on one substrate.

3. The electro-optical device according to claim 1, further comprising a step difference reduction film provided on the one substrate so as to define the concave portion on the one substrate, the step difference reduction film being provided under, in plan view, the seal material,
   wherein the upper surface of the coloring layer facing the electro-optical material is formed nearer to the other substrate of the pair of substrates than a surface of the step difference reduction film facing the seal material.

4. The electro-optical device according to claim 3, wherein the step difference reduction film is formed of any one of an insulating film, a metal film and photoresist.

5. An electronic apparatus comprising the electro-optical device according to claim 1.

6. A color filter substrate comprising:
   a substrate;
   a step difference reduction film provided on the substrate so as to define a concave portion on the substrate; and
   a coloring layer provided in the concave portion defined on the one substrate, the coloring layer including a plurality of adjacent color filter layers for respective plural colors,
   wherein a substantially flat upper surface of the coloring layer extending across the plurality of adjacent color filters is more protruding than an upper surface of the step difference reduction film, the substantially flat upper surface of the coloring layer being located on an opposite side of the coloring layer than a surface of the coloring layer facing the substrate, and the upper surface of the step difference reduction film being located on an opposite side of the step difference reduction film than a surface of the step difference reduction film facing the substrate.

7. A color filter substrate comprising:
a substrate;
an insulating film provided on the substrate;
a step difference reduction film formed on the substrate by removing a portion of the insulating film, the step difference reduction film defining a concave portion on the substrate; and
a coloring layer provided in the concave portion defined on the one substrate, the coloring layer including a plurality of adjacent color filter layers for respective plural colors,
wherein a substantially flat upper surface of the coloring layer extending across the plurality of adjacent color filters is more protruding than an upper surface of the step difference reduction film, the flat upper surface of the coloring layer being located on an opposite side of the coloring layer than a surface of the coloring layer facing the substrate, and the upper surface of the step difference reduction film being located on an opposite side of the step difference reduction film than a surface of the step difference reduction film facing the substrate.

8. An electro-optical device comprising:
a pair of substrates;
an electro-optical material sandwiched between the pair of substrates;
a seal material disposed in a seal region located at the periphery of a region in which the electro-optical material is provided on the pair of substrates so as to bond the pair of substrate to each other, between the pair of substrates;
a step difference reduction film provided on one substrate of the pair of substrates so as to define a concave portion on the one substrate, the step difference reduction film being provided under, in plan view, the seal material; and
a coloring layer provided in the concave portion defined on the one substrate, the coloring layer being formed under, in plan view, the region in which the electro-optical material is provided,
wherein an upper surface of the coloring layer facing the electro-optical material is formed nearer to the other substrate of the pair of substrates than a surface of the step difference reduction film facing the seal material.

* * * * *